United States Patent [19]

Krauss

[11] Patent Number: 4,817,970
[45] Date of Patent: Apr. 4, 1989

[54] FLUID SEAL HAVING A DIVIDED RING DISK

[75] Inventor: Olaf Krauss, Karlsfeld, Fed. Rep. of Germany

[73] Assignee: MTU Motoren- und Turbinen-Union Muenchen GmbH, Munich, Fed. Rep. of Germany

[21] Appl. No.: 46,996

[22] Filed: May 5, 1987

[30] Foreign Application Priority Data

May 23, 1986 [DE] Fed. Rep. of Germany ....... 3617279

[51] Int. Cl.$^4$ .......................... F16J 15/42; F16J 15/54
[52] U.S. Cl. ....................... 277/25; 277/148; 277/149; 277/174; 277/176; 277/194; 277/195; 277/198; 277/DIG. 5
[58] Field of Search ...................... 277/3, 25, 174, 176, 277/192, 193, 195, 149, 215, 53, 148, 187, DIG. 5, 189; 384/114, 134, 135, 478

[56] References Cited

U.S. PATENT DOCUMENTS

| 1,331,360 | 2/1920 | Parsons et al. | 277/149 X |
| 2,397,753 | 4/1946 | Salf | 277/174 |
| 3,117,716 | 1/1964 | Wernicke | 277/25 X |
| 3,160,416 | 12/1964 | Ryffel | 277/25 X |
| 3,460,842 | 8/1969 | Pointer et al. | 277/174 X |

FOREIGN PATENT DOCUMENTS 3119467 12/1982 Fed. Rep. of Germany .

Primary Examiner—Allan N. Shoap
Attorney, Agent, or Firm—W. G. Fasse; D. H. Kane, Jr.

[57] ABSTRACT

A fluid seal between two spaces, especially spaces between two concentric shafts, has radially extending inner rings secured to the inner shaft and forming a radially extending guide slot, and at least two radially outer ring segments (3a, 3b) guided in the radially extending guide slot to form a gas bearing type gap (7') between a radially inwardly facing surface of the outer hollow shaft and a radially outwardly facing surface of the respective ring segment, when the segments are in their operating position. Each ring segment is biased by a tension spring (15) into a radially inward rest positon. The inward pulling force of these springs is overcome by the centrifugal force which moves the ring segments radially outwardly when the inner shaft rotates so that the ring segments form the gas bearing type gap. The springs are so dimensioned that the ring segments form a gas bearing type of seal in said gas bearing type gap under all operating conditions including a start-up phase and a deceleration phase of an engine.

12 Claims, 3 Drawing Sheets

FLUID SEAL HAVING A DIVIDED RING DISK

FIELD OF THE INVENTION

The invention relates to a fluid seal with a divided ring disk, especially for sealing two spaces from each other in a contact free manner. The spaces are formed between an inner shaft and an outer shaft, for example, of a high speed turbo engine, whereby the fluid seal utilizes a gas bearing effect.

DESCRIPTION OF THE PRIOR ART

German Patent Publication (DE-OS) No. 3,119,467 describes a fluid bearing of the above type. However, the prior art fluid bearing relates exclusively to a thrust bearing. In other words, the conventional bearing and its seal must be capable of taking up thrust forces in the axial direction. Such axial thrust forces occur during the operation of the bearing and its seal. The known bearing seal uses springs which press a sealing ring against a sealing surface in the axial direction. It has been found that such a structure is not quite capable of maintaining the seal, especially in connection with high speed turbo engines and particularly if high circumferential speeds are effective at the sealing surface during operation of the engine. The requirement that the seal must be maintained even if high circumferential speeds are occurring at the sealing surface, is to be met in addition to the known requirements of coping with the centrifugal forces and with the prevailing high temperatures. Additionally, such bearings must accommodate manufacturing tolerances between the two shafts as well as deviations of the shafts from a true circular cross-section. Such seals must also be able to permit small longitudinal, or rather axial movements of the shafts relative to each other. Further, the seal must remain effective even under irregular or oscillatory motions of one or both shafts.

OBJECTS OF THE INVENTION

In view of the foregoing it is the aim of the invention to achieve the following objects singly or in combination:

to provide a disk type fluid seal which satisfies the above mentioned requirements while utilizing or causing a so-called gas bearing effect to provide a seal which is at least partially contactless;

to construct the disk type seal in such a manner that it will accommodate relatively large radial tolerances as well as axial play between the two shafts that enclose the space to be separated into two chambers at different pressures by the present seal; and to make sure that even under the above mentioned adverse operating conditions the gap between the sealing disk elements and the respective sealing surfaces will remain sufficiently narrow to take advantage of the so-called gas bearing effect.

SUMMARY OF THE INVENTION

The invention achieves the above objectives and resulting advantages by the fact that between an inner shaft and an outer shaft a sealing disk is held in an axial mounting which substantially prevents an axial movement of the sealing disk. Simultaneously, the sealing disk is so divided that it can perform radial movements to compensate substantial radial tolerances. In other words, the radial movements of the disk sections or segments bridge such large radial tolerances while simultaneously sealing an inner radial gap to form an axial seal. The ring disk sections or segments, have a ring shaped surface which forms an air or gas type gearing gap between itself and an inwardly facing surface of a hollow outer shaft to thereby utilize the gas or air bearing effect.

The advantages of the fluid seal according to the invention are seen in that, for example, even where there are large dimensional and material differences between the inner and the outer shaft, a small gap is always maintained. This sealing gap functions simultaneously as a support gap in the manner of a gas or air bearing. This function is assured even if, due to the mentioned large material or dimensional differences, the expansion differences are correspondingly large. Since the seal according to the invention is substantially contactless, it is, for all practical purposes, not limited by any circumferential speed between the components. The present seal is ideally suited for use between two turbo engine shafts because it has been found that the wide range of requirements to be met during the operation of the shafts of such engines is well satisfied by the present seal, especially in an intermediate shaft bearing. The direction of rotation of the two shafts relative to each other is immaterial so that the present seal can be used between shafts which rotate in the same direction or in opposite directions. Particularly, the last possibility opens a wide range of applications of the present fluid seal.

The present invention does not require any spring elements that are effective during the sealing. By the suitable construction of the present sealing disk, or rather of its sections or segments, the invention achieves a circumferential seal in which the gas dynamic lubricating effect is assured. Simultaneously, the invention accommodates shafts that are not perfectly round and it even takes up radial and axial tolerances as well as irregular movements of the shaft, including a rolling or pitching movement.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
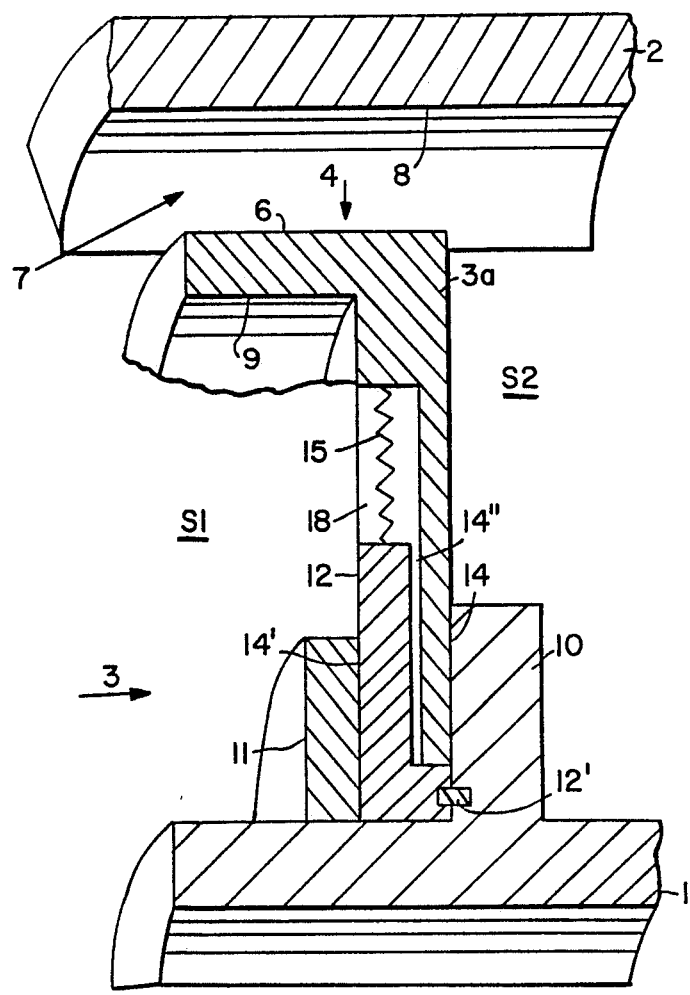
FIG. 1 is an axial, sectional view along section line 1—1 in FIG. 3 of a seal according to the invention, whereby the scale of FIG. 1 is somewhat enlarged relative to that of FIG. 3, and wherein sealing disk elements forming the seal is shown in its rest position with parts broken away to simplify the illustration.
Figure 2:
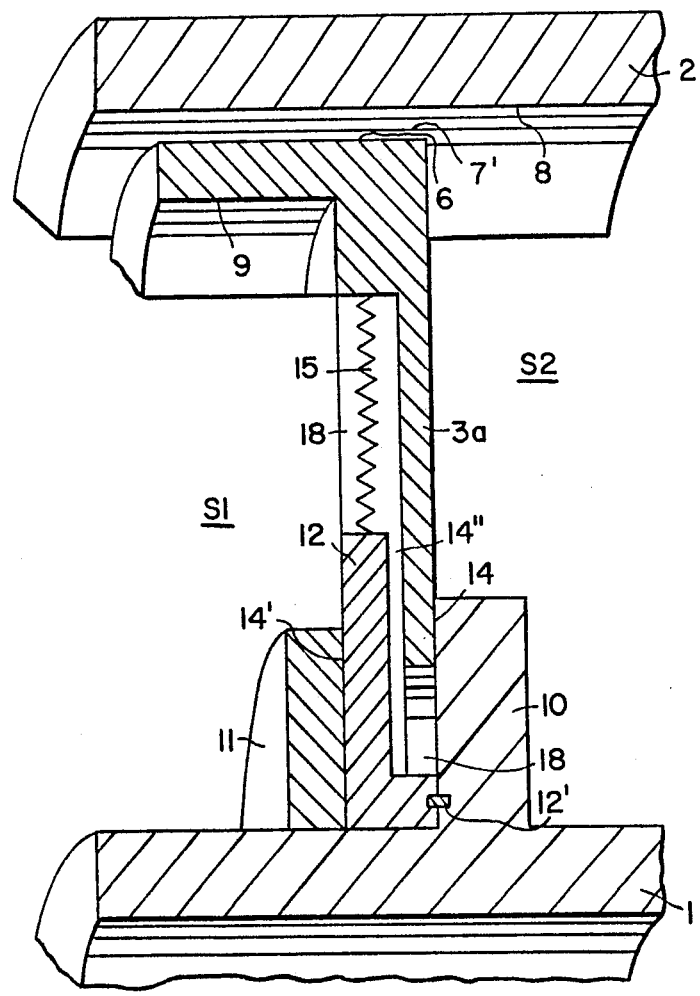
FIG. 2 is a section view similar to that of FIG. 1, but showing the sealing disk segments in a sealing or working position.
Figure 3:
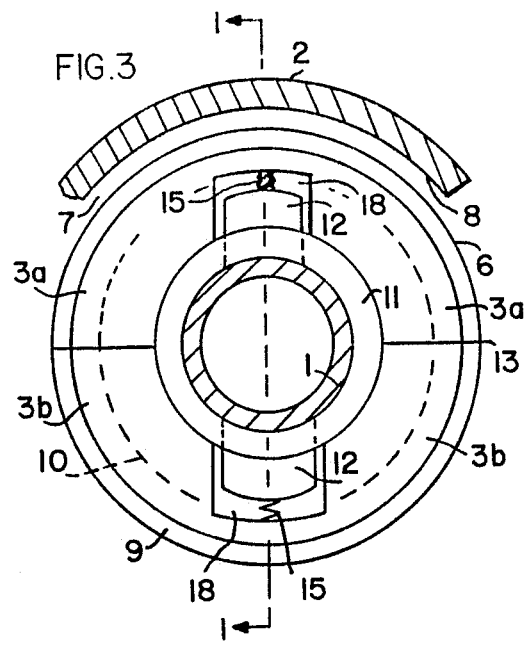
FIG. 3 is a view in the direction of arrow 3 in FIG. 1.

Parts are shown broken away in FIGS. 1, 2, and 3 to simplify the illustration. Further, in FIGS. 1 and 2 only the upper half of the seal structure is shown because the seal has a rotational symmetry so that portions below the central rotational axis of the shaft 1 are the same as those above that axis.

Referring to FIGS. 1 and 2, the present seal is located between an inner shaft 1 which may be a hollow shaft, and an outer hollow shaft 2 to separate two spaces S1 and S2 for example in a gas turbine engine. A first ring flange 10 extending radially away from the shaft 1 and a second ring 11 rigidly secured to the shaft 1 are spaced from each other to form a radial ring guide slot around the inner shaft. As shown in FIG. 3, a plurality of radially extending sealing disk elements 3a, 3b are inserted and guided for radial movement into the radial guide slot between the rings 10 and 11. The axially facing radially extending surfaces of the sealing disk elements are guided in the ring guide slot. In the rest position shown in FIG. 1, and in the operating position shown in FIG. 2, an axial seal 14 is formed between the radial axially facing outer surface of the elements 3a and 3b on the one hand, and the respective axially facing radially extending surface of the ring flange 10 on the other hand.

For providing a sufficient radially outwardly facing surface 6, each sealing element 3a, 3b is provided with an axially extending flange 9 to form a gap 7 between the radially outwardly facing surface 6 of the flange 9 and the radially inwardly facing surface 8 of the hollow shaft 2.

In the operating state shown in FIG. 2 when at least the inner shaft 1 rotates in one or the opposite direction, the sealing elements 3a, 3b move radially outwardly to form an operating gap 7' which is substantially narrower than the gap 7 in the rest position shown in FIG. 1. The gap 7' in the operating position of the sealing elements is small enough in its radial dimension to form a gas bearing type of seal and to develope a socalled pressure wedge in the gap 7' to permit the establishment of a pressure difference between the spaces S1 and S2. For example, the pressure in the space S1 may be larger than the pressure in the space S2.

Each sealing disk element 3a, 3b is provided with a radially extending guide groove 18 in which tongue 12 is received with a sliding fit. Each guide tongue 12 is rigidly secured to the shaft 1, for example at 12', so that the tongues 12 rotate with the shaft 1, thereby entraining the respective sealing disk element 3a or 3b. The locking ring 11 is tightly fitted against the guide tongue 12 as shown at 14'. The gap 14" between the tongue 12 and the respective surface of the disk element 3a, 3b is shown in an exaggerated manner to indicate that there is a sliding fit between the guide tongue 12 and its disk element 3a or 3b. A spring 15 is connected, for example, between the radially outer end of the guide tongue 12 and the respective disk element 3a, 3b. The springs 15 are so dimensioned that in the rest position of FIG. 1, the sealing disk elements 3a, 3b will be held in their radially most inward position as shown in FIG. 1. The springs 15 are further so dimensioned that as soon as the shaft 1 begins to rotate, the sealing disk elements 3a, 3b are free to move radially outwardly into the position shown in FIG. 2 to form the gas bearing type of gap 7' as shown in FIG. 2. It is convenient to locate the springs 15 in the guide grooves 18. However, these springs may also be connected in any other suitable place between the disk elements and the rotating shaft 1.

In FIG. 3 the space between the guide groove 18 and the guide tongue 12 is also shown exaggerated to indicate the sliding fit. The gap 13 that results when the two sealing disk elements 3a move radially outwardly, can be avoided or its effect at least minimized by giving the ring flange 10 a respectively large diameter. Another possibility would be to provide a certain circumferential overlap between the sealing disk elements 3a and 3b by axially displacing these elements relative to each other if these elements do not have the axially extending radially outer ring flange 9. Where the sealing disk elements 3a, 3b have the ring flange 9, they could possibly be arranged in a back to back fashion with the mentioned overlap to avoid the gap 13. Thus, the ring flange 9 of one element would face to the left and the ring flange of the other element would face to the right to avoid the gap 13.

Figure 4:
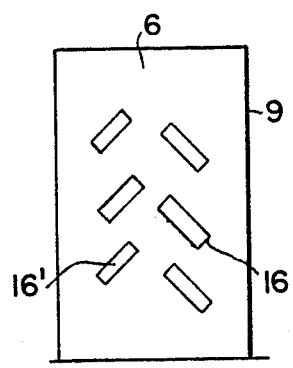
FIG. 4 is a view in the direction of the arrow 4 in FIG. 1.

FIG. 4 shows a portion of the surface 6 of the ring flange 9 as viewed in the direction of the arrow 4 in FIG. 1. The surface 6 is provided with air pockets 16 and 16' which are preferably arranged in a fish bone pattern whereby the longitudinal axes of air pockets in one ring or set of air pockets slant relative to the longitudinal axes of the air pockets in a neighboring ring or set of airpockets. These air pockets increase the sealing effect in the gap 7'. Preferably, the pockets 16 in one ring of pockets are longer than the pockets 16' in the other ring of pockets. Further, the pockets 16 extend preferably with their longitudinal axis approximately at a right angle relative to the longitudinal axis of the pockets 16'.

Figure 5:
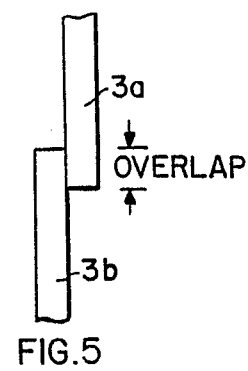
FIG. 5 shows a circumferential overlap between axially displaced sealing disk elements.

FIG. 5 shows that the sealing disk elements 3a and 3b are axially displaced relative to each other for providing an overlap in the circumferential direction to avoid the gap 13 when the elements 3a, 3b are in the radially outer working position.

The present gas bearing type of seal will be used mainly in gas turbine engines, particularly for aircraft. However, the present seal is useful in any situation where a rotating shaft rotates within another hollow member. The direction of rotation of the inner hollow shaft is not critical and the outer hollow member may even be stationary or it may rotate in the direction of the inner shaft or opposite thereto.

Although the invention has been described with reference to specific example embodiments, it will be appreciated that it is intended to cover all modifications and equivalents within the scope of the appended claims.

What I claim is:

1. A fluid seal for sealing two spaces from each other, said spaces being enclosed by an inner rotating shaft and an outer member, comprising ring means forming a radial ring guide slot around said inner shaft, and a plurality of sealing disk elements having radial surfaces guided for radial movement in said radial ring guide slot, said radial surfaces of said sealing disk elements forming with said ring means an axial seal between said two spaces, said sealing disk elements further having radially outer axial surfaces facing an inner surface of said outer member for forming a radial seal having a small enough gap with said outer member during rotation of the shaft as to define a gas bearing type of seal within the formed gap, said ring means restraining substantially any axial movement of said sealing disk elements and wherein each of said sealing disk elements has a substantially radially extending guide groove, said fluid seal further comprising a radially extending guide tongue for each of said radially extending guide grooves, said guide tongues being rigidly secured for cooperating with said radial ring guide slot in radially guiding movement of said sealing disk elements, said guide tongues rotating with said inner shaft for entraining said sealing disk elements with the rotation of said inner shaft to cause said sealing ring disk elements to move radially outwardly in the respective radially extending guide groove.

2. The fluid seal of claim 1, wherein said sealing disk elements have the shape of segments.

3. The fluid seal of claim 1, further comprising spring means for exerting a radially inwardly effective spring force between each of said sealing disk elements and said inner shaft for urging the respective sealing disk element radially inwardly when said inner shaft is not rotating.

4. The fluid seal of claim 1, wherein said spring means are interposed between said tongues and the respective sealing disk element so that said spring means are located in respective radially extending guide grooves.

5. The fluid seal of claim 3, wherein said spring means (15) are so dimensioned that said radially inwardly effective spring force is overcome by centrifugal force when said inner shaft is rotating for permitting the radially outward movement of said sealing disk elements.

6. The fluid seal of claim 3, wherein at least two guide tongues are arranged diametrically opposite each other, said spring means comprising two spring elements also arranged diametrically opposite each other.

7. The fluid seal of claim 1, wherein said sealing disk elements have axially extending outer ring flanges with radially outwardly facing surfaces forming with a radially inner surface of said outer shaft a gap in which said gas bearing effect prevails.

8. The fluid seal of claim 7, wherein said radially outwardly facing surface of said ring flanges have air pockets therein.

9. The fluid seal of claim 8, wherein said air pockets are arranged in a pattern so that longitudinal axes of one set of air pockets slant relative to longitudinal axes of another neighboring set of air pockets.

10. The fluid seal of claim 1, wherein said outer member is an outer hollow shaft.

11. The fluid seal of claim 1, wherein said radial seal forms a radial gap which has a small enough radial dimension in an operating position of said sealing elements to develop a pressure wedge in said radial group.

12. The fluid seal of claim 1, wherein said sealing disk elements are axially displaced relative to each other, said sealing disk elements further having an overlap in a circumferential direction.

* * * * *

UNITED STATES PATENT AND TRADEMARK OFFICE
CERTIFICATE OF CORRECTION

PATENT NO. : 4,817,970

DATED : April 4, 1989

INVENTOR(S) : Olaf Krauss

It is certified that error appears in the above-identified patent and that said Letters Patent is hereby corrected as shown below:

In [57] ABSTRACT, line 11, replace "positon." by --position.--.

In Claim 4, (Column 5, line 14), replace "claim 1" by --claim 3--.

In Claim 11, (Column 6, line 20), replace "group." by --gap.--.

Signed and Sealed this

Seventeenth Day of October, 1989

Attest:

DONALD J. QUIGG

Attesting Officer

Commissioner of Patents and Trademarks